United States Patent [19]

Tanaka et al.

[11] Patent Number: 5,506,783
[45] Date of Patent: Apr. 9, 1996

[54] METHOD AND APPARATUSA FOR DETERMINING SUPPLY SEQUENCE OF PRODUCTS OT BE PROCESSED TO PRODUCTION LINE

[75] Inventors: Kiyofumi Tanaka, Hadano; Junichi Ikebe, Yokohama; Hidetoshi Haga, Hadano, all of Japan

[73] Assignees: Hitachi, Ltd.; Hitachi Communication Systems, Inc., both of Japan

[21] Appl. No.: 268,375

[22] Filed: Jun. 29, 1994

[30] Foreign Application Priority Data

Jun. 29, 1993 [JP] Japan .................................. 5-159766

[51] Int. Cl.⁶ ...................................... G06F 17/00
[52] U.S. Cl. ........................... 364/468; 364/401; 364/402
[58] Field of Search ..................................... 364/131, 138, 364/140, 468, 469, 401–403, 478, 148, 149

[56] References Cited

U.S. PATENT DOCUMENTS

| 5,233,533 | 8/1993 | Edstrom et al. | 364/468 |
| 5,237,508 | 8/1993 | Furukawa et al. | 364/468 |
| 5,291,397 | 3/1994 | Powell | 364/402 |
| 5,327,340 | 7/1994 | Kaneko et al. | 364/402 |

FOREIGN PATENT DOCUMENTS

| 63-323495 | 7/1990 | Japan . |
| 63-159752 | 2/1991 | Japan . |
| 64-182580 | 3/1991 | Japan . |
| 64-182886 | 3/1991 | Japan . |
| 2224555 | 5/1991 | Japan . |
| 64-282356 | 6/1991 | Japan . |
| 64-305352 | 7/1991 | Japan . |
| 1335812 | 8/1991 | Japan . |
| 2127678 | 1/1992 | Japan . |
| 2197404 | 3/1992 | Japan . |
| 2190887 | 3/1992 | Japan . |
| 2197403 | 3/1992 | Japan . |
| 2220023 | 4/1992 | Japan . |
| 2220970 | 4/1992 | Japan . |
| 2222223 | 4/1992 | Japan . |

*Primary Examiner*—Tan V. Mai
*Assistant Examiner*—Thomas E. Brown
*Attorney, Agent, or Firm*—Jenner & Block

[57] ABSTRACT

A method of determining supply sequence of products to be processed to an N-step flow shop type production line, where N is an integer N greater than or equal to 2, is disclosed. To optimize the production time of all the products in the N-step flow shop type production line with high precision, the supply sequence of products to be processed to the N-step flow shop type production line is determined by virtually dividing the N steps to 2 virtual steps on the basis of a total number of necessary man-hour of products to be processed, sequencing the supply of the products to be processed in one of the virtual steps to a first step of the N steps in the order of smallness of the required man-hours for the product, storing the product to be processed in the other virtual step in a stack memory as products for which a new supply sequence is to be determined and repeating the supply sequence determining processing recurrently as long as N is greater than or equal to 2 and the stack memory contains stored virtual steps.

13 Claims, 14 Drawing Sheets

METHOD AND APPARATUSA FOR DETERMINING SUPPLY SEQUENCE OF PRODUCTS OT BE PROCESSED TO PRODUCTION LINE

The present invention relates to a method and apparatus for determining a supply sequence of products to be processed to an N-step flow-shop type production line, where N is an integer greater than or equal to two, and a method and apparatus for determining a worker arrangement along the production line.

BACKGROUND OF THE INVENTION

One of the productive constructions in various manufacturing fields is an N-step flow-shop type production line which is widely used in assembling works for diversified small-quantity production. Frequently, the supply sequence of the products to the N-step flow-shop type production line is manually determined and usually is determined randomly in handling order (in arrival order) or according to a priority determined by the appointed date of delivery. Moreover, although automatic supply sequence determination calculation methods are known, they require a large amount of calculation and do not provide a method for obtaining an optimum solution. As a result, errors in worker assignment occur frequently due to errors in the production supply sequence planning and errors in the estimates of man-power supply.

In order to solve these problems, extensions of the calculation method of a 2-step flow-shop type production line to an N-step type production line have been studied. In particular, Johnson's rule for the 2-step flow-shop type production line is known and is widely used as a production managing method. In addition, for N-step flow-shop type production lines, Petrov's algorithm is famous. These algorithms are described in detail in Katsundo Hitomi, "Production System Engineering", Kyoritsu Publishing Company. In addition, a new method based on a parallel processing computer has been proposed recently. Details of the new method are disclosed in, for example, "Parallel Algorithm for Minimization of Total Required Time in Flow-Shop Scheduling and Realization Thereof On nCUBE2", Information Processing Engineers Association, Software Engineering Institute, material 87-6 (1992.9.29), pp. 51–57.

For the problem of determining a product supply sequence for a production line, the following apparatuses and methods have been proposed.
(1) Japanese Patent Application No. S63-323495, for "Deciding Method For Production Order In Inclusion Production Line" (Patent application laid-open No. H2-172658, Jul. 4, 1990)
   This application relates to a method for determining a production sequence by obtaining a productive priority by referencing a product request information and an indication information from a production indicator device to knowledge data stored in a memory device.
(2) Japanese Patent Application No. H1-159752, for "Input Order Planning Method For FMS Production Line" (Patent Application Laid-open No. H3-26448, Feb. 5, 1991)
   This application relates to a method for stabilizing production by predicting which work piece input will cause a jig shortage and an associated delay for mounting and dismounting the jigs and subsequently employing a supply sequence in which the occurrence of such phenomena is minimized.
(3) Japanese Patent Application No. H1-182580, for "Estimating Simulation Method In Production Line" (Patent Application Laid-open No. H3-49853, Mar. 4, 1991)
   This application relates to a method for simulating the production flow line for a plurality of flow production lines having fixed processing sequences and fixed processing times.
(4) Japanese Patent Application No. H1-182886, for "Production Schedule Adjusting Method" (Patent Application Laid-open No. H3- 49854, Mar. 4, 1991)
   This application relates to a method for decreasing the number of unfinished products by calculating a total production load quantity for a plurality of kinds of work pieces, and thereafter calculating a ratio representing the number of work pieces which occupy the total production load quantity.
(5) Japanese Patent Application No. H2-224555, for "Scheduling Method and Apparatus" (Patent Application Laid-open No. H3- 117542, May 20, 1991)
   Scheduling is performed automatically by using rules in a knowledge base.
(6) Japanese Patent Application No. H1-282356, for "Synchronous Production Scheduling Planning Device" (Patent Application Laid-open No. H3-149162, Jun. 25, 1991)
   This application relates to a method for obtaining a production schedule by assigning the respective assembling times of a product to respective production lines every unit of which is an integer multiple of a predetermined minimum working hour.
(7) Japanese Patent Application No. H1-305352, for "Method And Device For Planning Production Program" (Patent Application Laid-open No. H3-166047, Jul. 18, 1991)
   This application relates to a method for planning a production schedule by assigning start days of respective processings while averaging the number of productions on the basis of the number of productive capability per day and the optimum number of processings.
(8) Japanese Patent Application No. H1-335812, for "Production Planning Preparation Method" (Patent Application Laid-open No. H3-196948, Aug. 28, 1991)
   This application relates to a production planning preparation method by which neck steps are selected and a production schedule is produced such that waiting time becomes minimum.
(9) Japanese Patent Application No. H2-127678, for "Method And Device For Calculation Of Necessary Personnel For Production Line" (Patent Application Laid-open No. H4-25353, Jan. 29, 1992)
   This application relates to a method by which the number of workers necessary for production is calculated by referencing a total number of man hours required by a production and the number of committable man hours.
(10) Japanese Patent Application No. H2-220023, for "Production Sequency Planning Method" (Patent Application Laid-open No. H4- 105855, Apr. 7, 1992)
   This application relates to a method for calculating an expected value of production by assigned time period by dividing the number of productions within a production time period by a date of production, the number of productions per day is obtained by summing them of respective days, spaces corresponding to productions already made are provided and products to be placed every space are determined by averaging.
(11) Japanese Patent Application No. H2-220970, for "Production Sequence Decision Method" (Patent Application Laid-open No. H4- 105856, Apr. 7, 1992)

This application relates to a method for improving productivity. Initially, the products are classified in a plurality of groups according to the duration of a production required period and a production sequence is determined such that products of a plurality of kinds do not exist in mixed state in each of the classifications. Then, a production sequence is determined by averaging them between the classified groups.

(12) Japanese Patent Application No. H2-222223, for "Scheduling Device" (Patent Application Laid-open No. H4-105857, Apr. 7, 1992)

This application relates to a device for achieving lot scheduling at high speed by comparing the service starting time and finish time of a device or device information with the process startable time of an execution process, and determining the process starting time and ending time of the execution process.

(13) Japanese Patent Application No. H2-190887, for "Method and Apparatus for Modifying Production Schedule" (Patent Application Laid-open No. H4-82659, Mar. 16, 1992)

A work is displayed by a model which is a combination of partial works each having a constant amount of work and the partial works are interactively and graphically modified while constraining configuration of partial work, relation between partial works, and position thereof.

(14) Japanese Patent Application No. H2-197403, for "Preparation Of Production Program" (Patent Application Laid-open No. H4-82660, Mar. 16, 1992)

This application relates to a method for producing a production schedule by setting a production schedule reservation table in which the producability of a facility per unit time, production time, and appointed date of delivery are made correspondent on a memory and performing a production assignment of products by modifying values of the production schedule reservation table.

(15) Japanese Patent Application No. H2-197404, for "Changing Method For Production Program" (Patent Application Laid-open No. H4-82661, Mar. 16, 1992)

This application relates to a method for modifying a production schedule by calculating a remaining production time from a difference between a scheduled production number for every product type based on data of an assigned production schedule table and an actual production number and utilizing spare time.

As mentioned above, there are a variety of known methods and apparatuses proposed for automatically determining an optimum supply sequence for producing all products within minimum time (minimum number of steps) in the N step flow-shop type production line for diversified small-quantity production. However, in any of them, in order to reduce the amount of calculation by a computer, the N-steps are virtually divided to 2 steps and an optimal supply sequence for such a virtual 2-step flow shop type production line is determined. Therefore, a determined supply sequence is the optimal solution between the virtually divided 2 steps and only rough approximation can be obtained for minimization of a total production time for all products.

Therefore, a need exists for a method of determining a supply sequence for products to be processed in a N-step flow-shop type production line in which the total production time is minimized for all products. Further, a need exists for a method of determining an optimal supply sequence which takes into consideration products to be processed whose assembly has begun but is not complete ("undone products") or products to be processed quickly, either of which may occur in an actual production line. In addition, a need exists for a method of determining an optimal worker arrangement for producing all products in a minimum amount of time on the basis of a result of the automatic supply sequence determination. A need also exists for a method of evaluating the progression of a production schedule and a worker arrangement schedule on the basis of results of the automatic determinations of optimal supply sequence and optimal worker arrangement. A further need exists for a method of determining an optimal supply sequence which permits recalculation of the product supply sequence and the worker arrangement schedule based on a simulation of progressions of the respective steps.

SUMMARY OF THE INVENTION

The present invention is directed to overcoming these and other problems and a first object thereof is to provide a method and apparatus for determining a supply sequence of products to be processed to a production line, by which minimization of the total production time of all products is realized with high precision.

A second object is to provide a method and apparatus for determining a supply sequence of products to be processed to a production line, by which an optimal supply sequence can be determined by taking into consideration undone products or products to be processed quickly.

A third object is to provide a method and apparatus for determining a worker arrangement along a production line, by which an optimal number of workers for the production of all products within a minimum time can be assigned to respective steps in the production sequence.

A fourth object is to provide an apparatus for determining a worker arrangement along a production line, by which it can be easily confirmed whether or not a determined supply sequence and worker arrangement are appropriate.

In order to achieve the first object, a method of determining a supply sequence of products to be processed to a production line according to the present invention determines a supply sequence of products to be processed to an N-step flow-shop type production line by dividing the N-steps to 2 virtual steps on the basis of a total number of the pre-determined necessary man-hours of products to be processed. Thereafter, a supply sequence of the products to be processed in one of the divided steps is assigned to a first step in the order of smallness of their pre-determined necessary man-hours. If the other virtual step contains more than two individual steps, the products in the other divided step are stored in a stack memory as products for which a new supply sequence is to be determined. If the stack contains a virtual step, N is redefined as the number of individual steps in the stored virtual step and the supply sequence determination process is repeated recurrently as long as N is greater than or equal to two.

The apparatus for determining a supply sequence of products to be processed in a production line includes an external memory device for preliminarily storing a product database which registers the products to be assembled and the man-hours required for assembly of each of the products, as well as a stack memory for storing products for which the supply sequence has not been determined. The apparatus also includes a keyboard for inputting to the product database the products to be assembled and the pre-determined man-hours needed for assembly of each of the products. The apparatus further includes means for dividing the N-steps to two virtual steps on the basis of a total of the pre-determined man-hours for each product to be processed, means for assigning a supply sequence of the products to a first step in the order of smallness of the pre-determined man-hours of the products in one of the virtual steps, means for storing the products in the second virtual step in a stack memory as products for which a new supply sequence is to be determined if the second virtual step contains a plurality of individual steps, means for redefining N as being the number of individual steps contained in a virtual step stored in the stack memory, and means for providing a virtual step stored in the stack memory to the dividing means so as to repeat the supply sequence determining process recurrently as long as N is greater than or equal to two.

In order to achieve the second object, a method according to the invention for determining a supply sequence of products to be processed further includes the steps of assigning a date of determination to a first given date and thereafter identifying products having a second date which is less than the first given date, where the identified products have not been completely assembled. The products so identified are then assigned to a step in the N-step flow shop type production line. Thereafter, the N-steps are divided into two virtual steps to determine the supply sequence.

Further, in order to achieve the third object, a method of determining a worker arrangement according to the present invention initially involves calculating a man-hour pile for each of the steps in the N-step flow shop type production line and then searching for a flow shop step having a maximum man-hour pile. Thereafter, the necessary workers are assigned to the step having the maximum man-hour pile, and if the maximum man-hour pile is smaller than for one worker, that step and a step adjacent thereto are assigned to the same worker.

The apparatus for determining a worker arrangement comprises an external memory device for preliminarily storing a product database which registers products to be assembled and the pre-determined necessary man-hours for assembling each of the products, as well as a keyboard for inputting to the product database the products to be assembled and their respective pre-determined man-hours for assembly. The apparatus also includes means for determining the worker arrangement which comprises means for calculating man-hour piles for the respective steps in the N-step production line, means for sequentially searching for a step having a maximum man-hour pile, means for assigning necessary workers to the step having the maximum man-hour pile, and means for assigning at least a part of the steps adjacent to the step having a maximum man-hour pile to at least one worker assigned to the maximum man-hour pile step if the maximum man-hour pile is smaller than for one worker.

In order to achieve the fourth object, the apparatus for determining a worker arrangement further comprises simulation and operation means for producing time charts of respective steps by simulating progressions in the respective steps on the basis of a resultant worker arrangement in the respective steps and a resultant supply sequence determination of products to be processed and display means for displaying a resultant supply sequence determination as well as the progression state in the respective individual steps.

Since, with the above mentioned means, the conventional automatic determination method of optimum supply sequence to the virtual 2-step flow-shop type production line is modified such that a supply sequence of products to be processed to an N-step flow-shop type production line is determined by utilizing a computer memory (main memory device) as a stack memory, dividing N steps to 2 virtual steps on the basis of a total number of necessary man hours of products to be produced, assigning a supply sequence of the products to be produced in one of the divided steps to a first step in the order of smallness of their necessary man hours, storing products in the other divided step in a stack memory as products for which a new supply sequence is to be determined and repeating the supply sequence determining processing recurrently as long as N is greater than or equal to two and the stack memory contains stored virtual steps, it is possible to average the production time between two adjacent steps in the N-step flow shop and to realize a minimization of a total production time of all products.

Moreover, the supply sequence of the products to be processed in a current day is determined after an undone product of a preceding day is preliminarily assigned to an undone step and the supply sequence of the products to be processed preferentially is determined after they are rearranged in priority. Therefore, it is possible to determine an optimal supply sequence by taking undone products and products to be processed preferentially into consideration.

In addition, after the man-hour pile of each step is calculated, the steps to which workers are not assigned as yet are searched sequentially to find a step whose man-hour pile is maximum and the necessary workers are assigned thereto. Then, a step having pre-determined man-hours smaller than that for one worker is combined with steps adjacent thereto and assigned to one worker. Therefore, it is possible to assign workers in a manner which is optimal for producing all products within minimum time to the respective steps.

Additionally, whether or not the determined supply sequence and the determined worker arrangement are suitable can be easily confirmed by performing a simulation of the progression states of the respective N-steps on the basis of the results of the worker arrangement determination and the product supply sequence determination and displaying the results of the simulation on a display device.

DESCRIPTION OF THE PREFERRED EMBODIMENT

Figure 1:
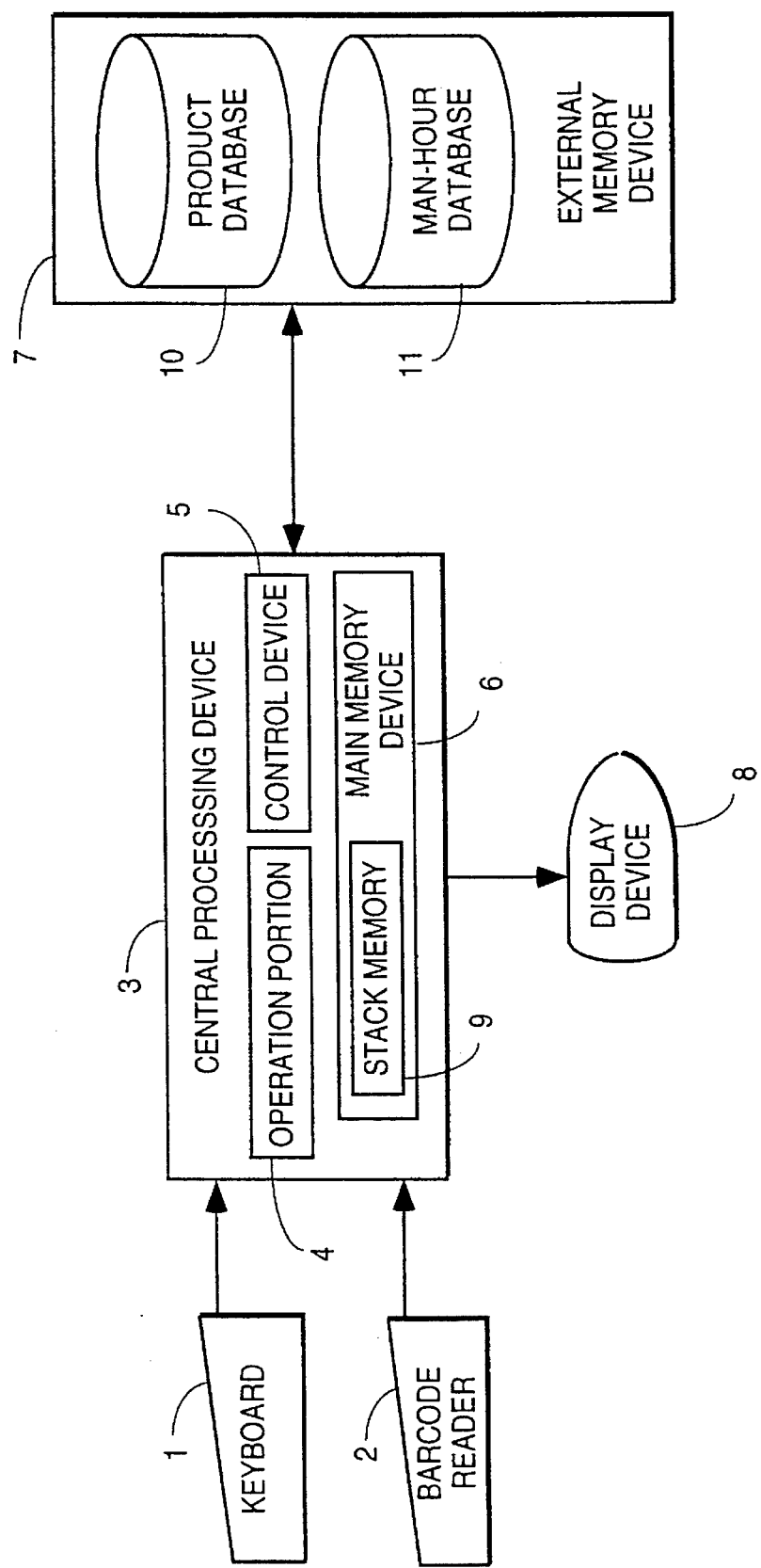
FIG. 1 is a block diagram showing an embodiment of a hardware construction of a product supply sequence and worker arrangement apparatus according to the present invention.

The present invention will be described with reference to embodiments shown in the drawings.

FIG. 1 is a block diagram showing a hardware construction of an embodiment of an apparatus for determining a supply sequence of products according to the invention. The apparatus includes a keyboard input device 1 and a bar code reader 2 as input means, and a central processing device 3 composed of an operation device 4, a control device 5 and a main memory device 6.

The main memory device 6 includes a stack memory 9 for storing a result of a recurrent division sequence to 2 virtual steps and adapting thereto Johnson's rule. The apparatus also includes an external memory device 7 for preliminarily storing a product database for registering products to be supplied and the pre-determined man-hours (or time) required in each of the respective steps for each of the products to be supplied. The results of the supply sequence determination and of simulations of a supply sequence determination are displayed on a display device 8. The external memory device 7 thus includes a product database 10 and a man-hour database 11.

Figure 2:
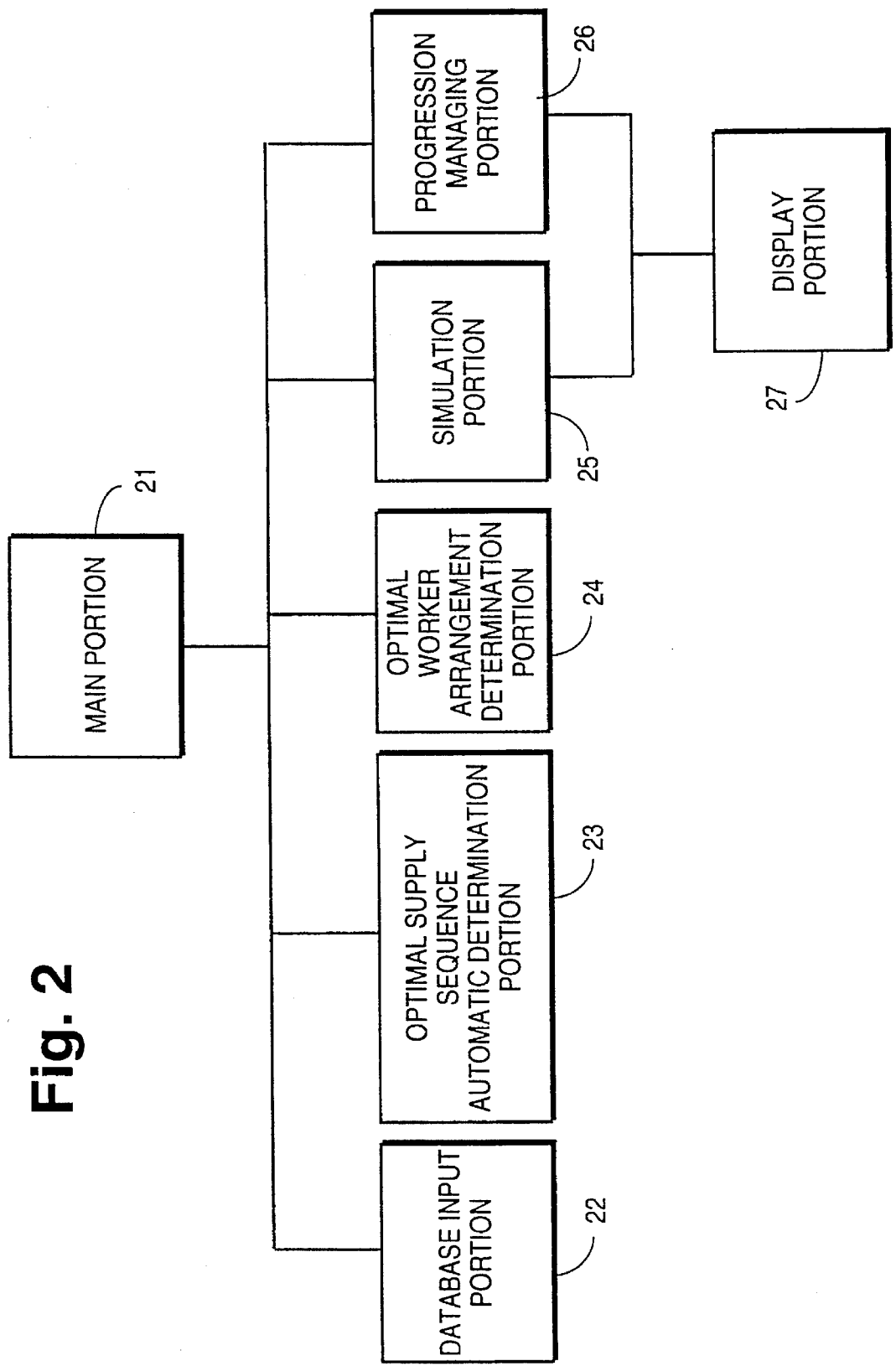
FIG. 2 is a block diagram illustrating the hierarchical structure of a group of programs used in a method for determining a supply sequence according to the invention.
Figure 3:
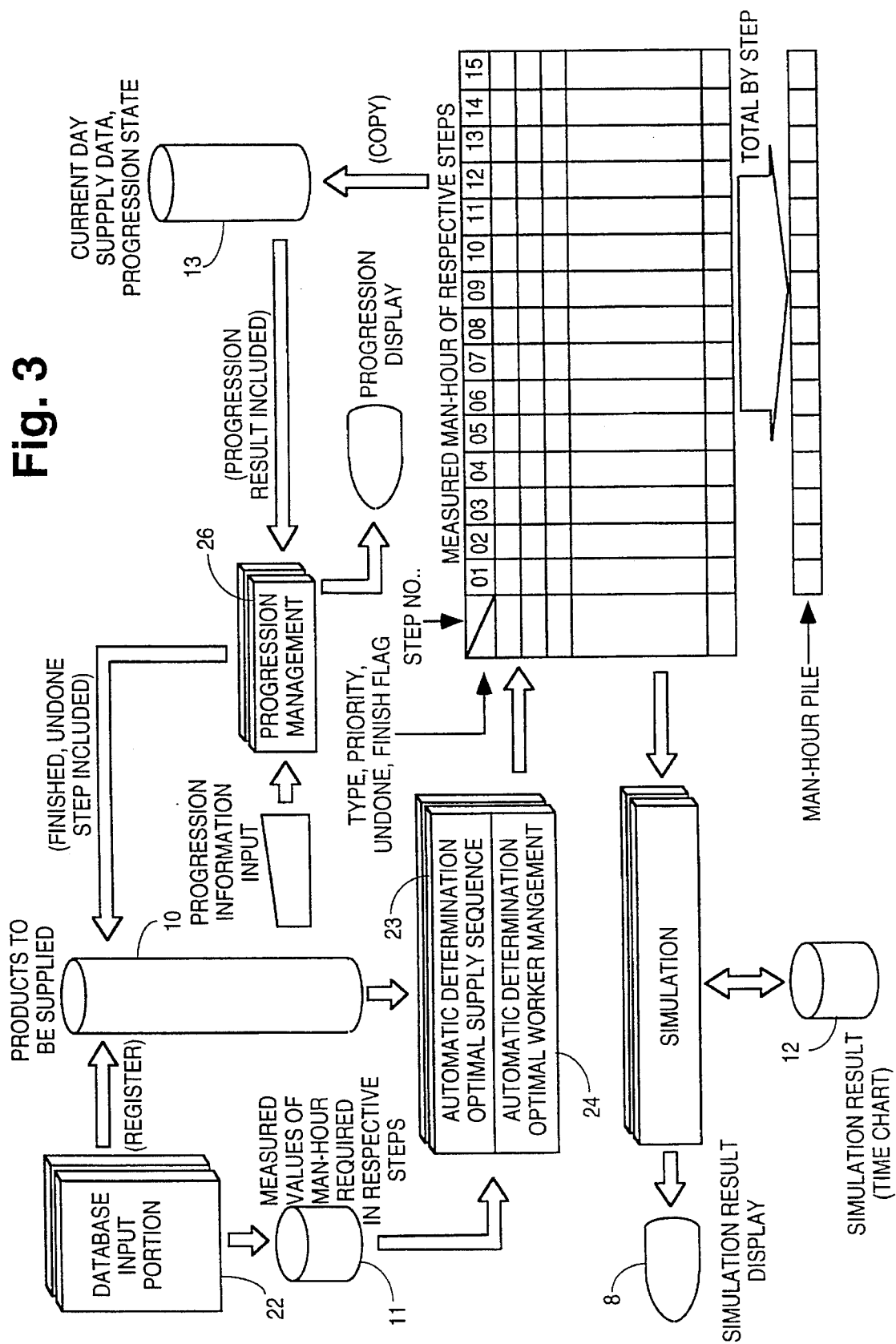
FIG. 3 is a block diagram illustrating the data flow in the apparatus in FIG. 1.
Figure 4:
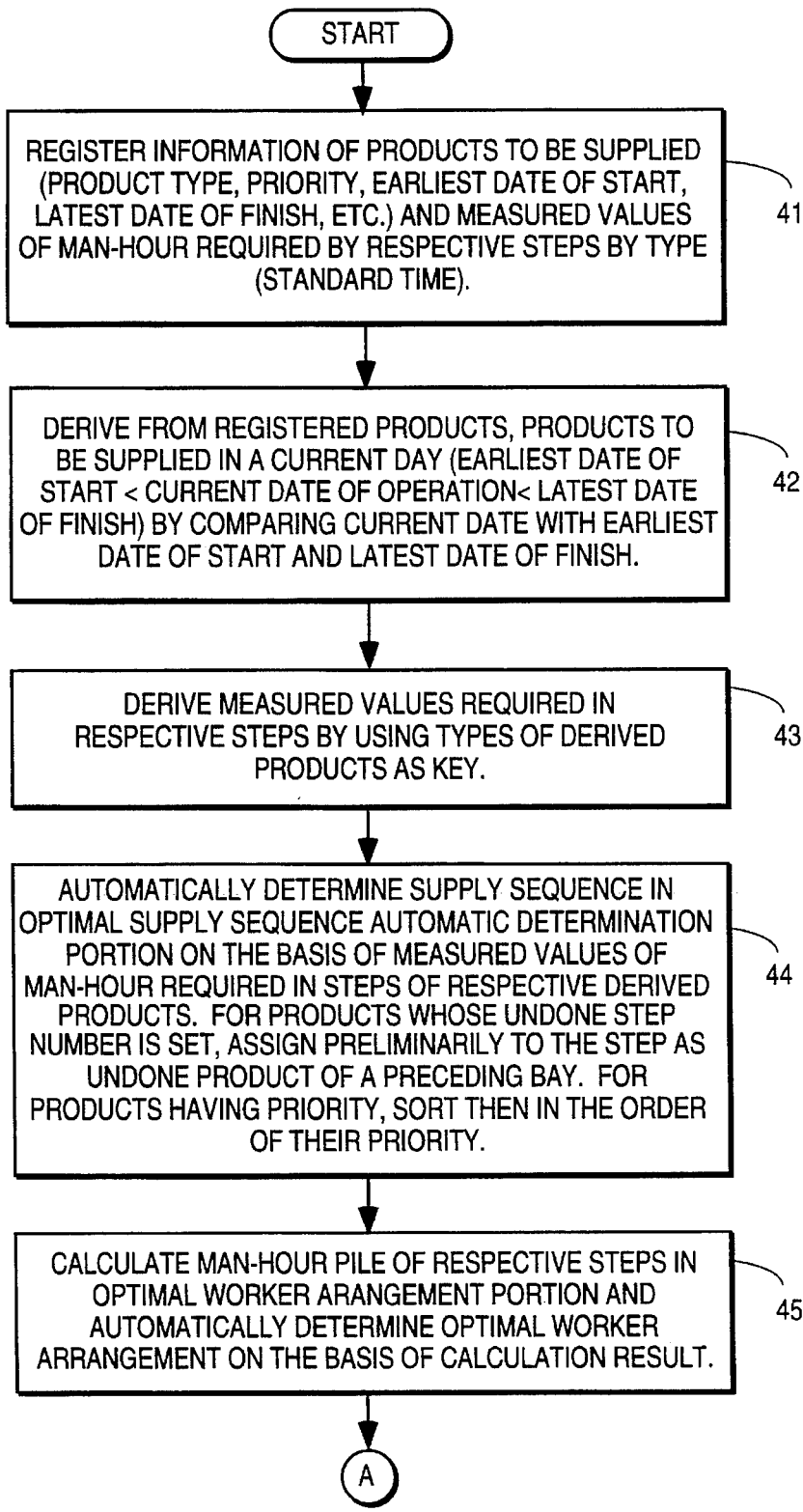
FIG. 4 is a flow chart showing an initial stage of procedures from the product supply sequence determination to the worker arrangement determination.
Figure 5:
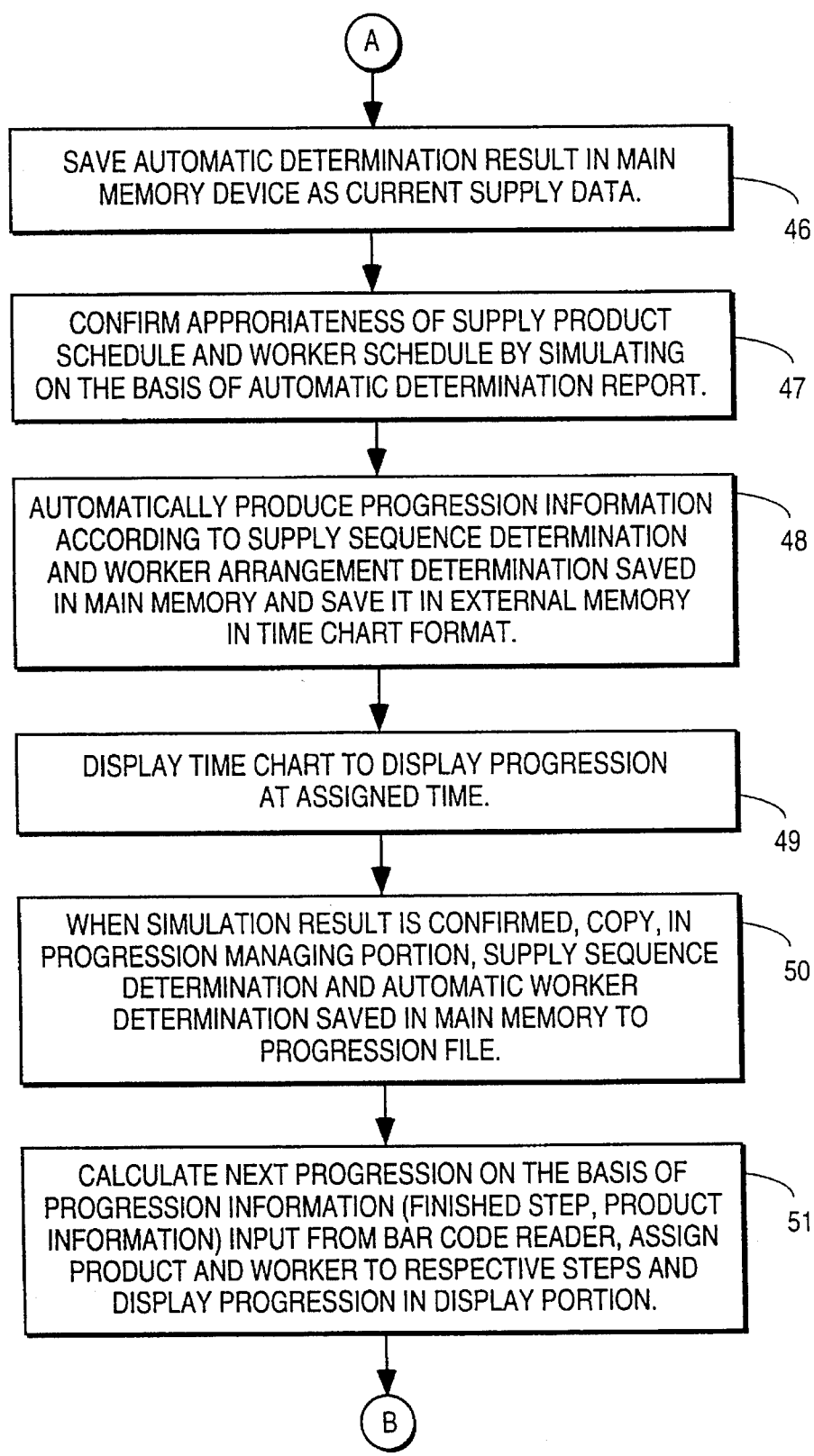
FIG. 5 is a continuation of the flow chart in FIG. 4, showing subsequent stages of the procedures from the product supply sequence determination to the worker arrangement determination.
Figure 6:
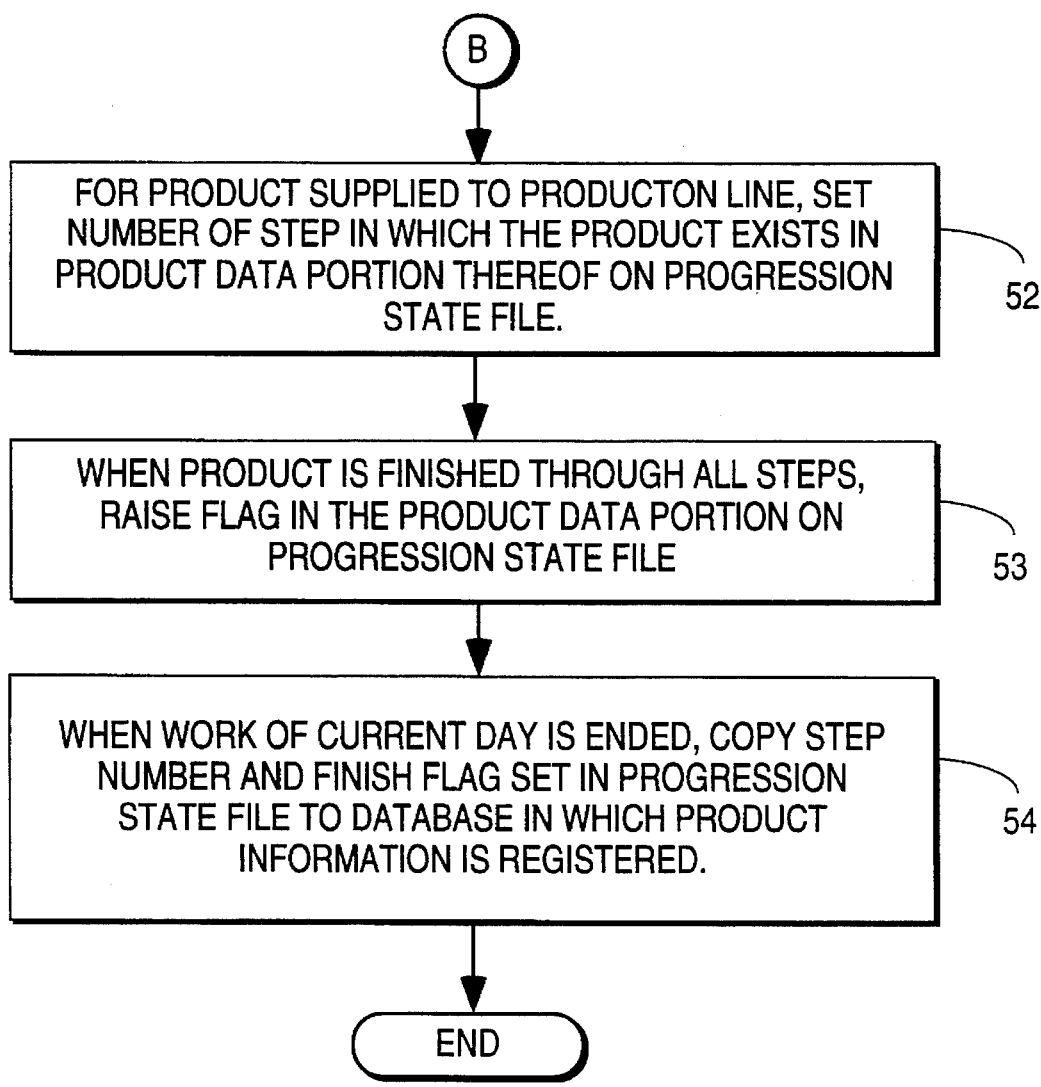
FIG. 6 is a continuation of the flow chart in FIG. 5, showing a last stage of the procedures from the product supply sequence determination to the worker arrangement determination.

FIG. 2 shows a hierarchical structure of a group of programs used in a method for determining a supply sequence of products, according to the invention. The hierarchical structure includes a main portion 21, a database input portion 22, an optimum supply sequence automatic determination portion 23, an optimum worker arrangement portion 24, a simulation portion 25, a progression management portion 26, and an information display portion 27.

The data flow and the determination procedures in a method according to the invention will be described with reference to FIG. 3 and FIGS. 4 to 6.

Initially, product information on the products to be supplied (type, priority, earliest scheduled date on which processing is started, latest scheduled finishing date, etc.) and the measured values of the man-hours required in the respective steps of the N-step flow shop type production line (standard time) are registered by product type in the product database 10 and the man-hour database 11 by using the database input portion 22 (step 41). Next, the products to be supplied in a current day in which this apparatus is operated are selected from the products registered in the product database 10 by comparing the current date with the earliest scheduled date on which processing is started and the latest scheduled finishing date. All products are selected which have an earliest scheduled processing start date less than the current date and a latest scheduled finishing date greater than the current date (step 42).

The measured values of the man-hours required in the respective steps are then derived from the man-hour database 11 by using the type of the selected product as a key (step 43). Thereafter, the supply sequence is automatically determined in the optimum supply sequence automatic determination portion 23 on the basis of the measured values of the man-hours required in the respective N-steps of the respective derived products (step 44).

If a product thus derived has an undone step number set in its step number column, it is directly assigned to the undone step preliminarily as an undone product of a preceding day such that it can be processed directly from the undone step. Further, products whose priorities are set are sorted in the optimum supply sequence automatic determination portion 23 in the order of the priorities.

In the optimum worker arrangement determination portion 24, piles of man-hours are calculated for every step and an optimum worker arrangement is determined by averaging a load man-hour for each of the steps as the minimum number of workers possible on the basis of a result of the calculation (step 45). Finally, the results of the automatic determinations are saved in the main memory device 6 as a current day supply data (step 46).

A simulation based on the results of the automatic determination is performed in the simulation portion 25 to check the appropriateness of the supply product schedule and the worker schedule (step 47). In the simulation, progression information is automatically produced according to the automatic determinations of the supply sequence and the worker arrangement. The result of the simulation is saved in the file 12 of the external memory device 7 in the form of a time chart (step 48).

The results of the simulation can be reviewed in at least two ways. First, progression states which are sequentially derived from the time chart saved in the file 12 can be fast-displayed in the display portion 27. Alternatively, when a specific time is input from the keyboard 1, the progression state at that time is displayed (step 49). When the simulation result is confirmed by a manager, the automatic determination results of the supply sequence and the worker arrangement which are stored in the main memory device 6 are copied, in the progression state manager portion 26, to the progression state file 13 of the external memory device 7 (step 50).

The next progression state is calculated on the basis of the progression information (finished step, product information) input from the bar code reader 2. The products and workers for the respective steps are assigned and the progression state is displayed on a screen of the display device 8 in the display portion 27 (step 51 ). The step numbers in which products supplied to the production line are set in the data portions of these products in the progression state file 13 (step 52). When all the steps of a product are finished, a finish flag is set in the data portion of the product in the progression state file 13 (step 53). Finally, when the work of the current day is over, the step numbers and the finish flags set in the progression state file 13 are copied to the product database 10 which registers product information (step 54). When supply products are derived for the next day, products for which the finish flags are set are excluded from those for which the supply sequence is to be determined and products whose step numbers are set are derived as undone products and processed from the undone steps.

Figure 7:
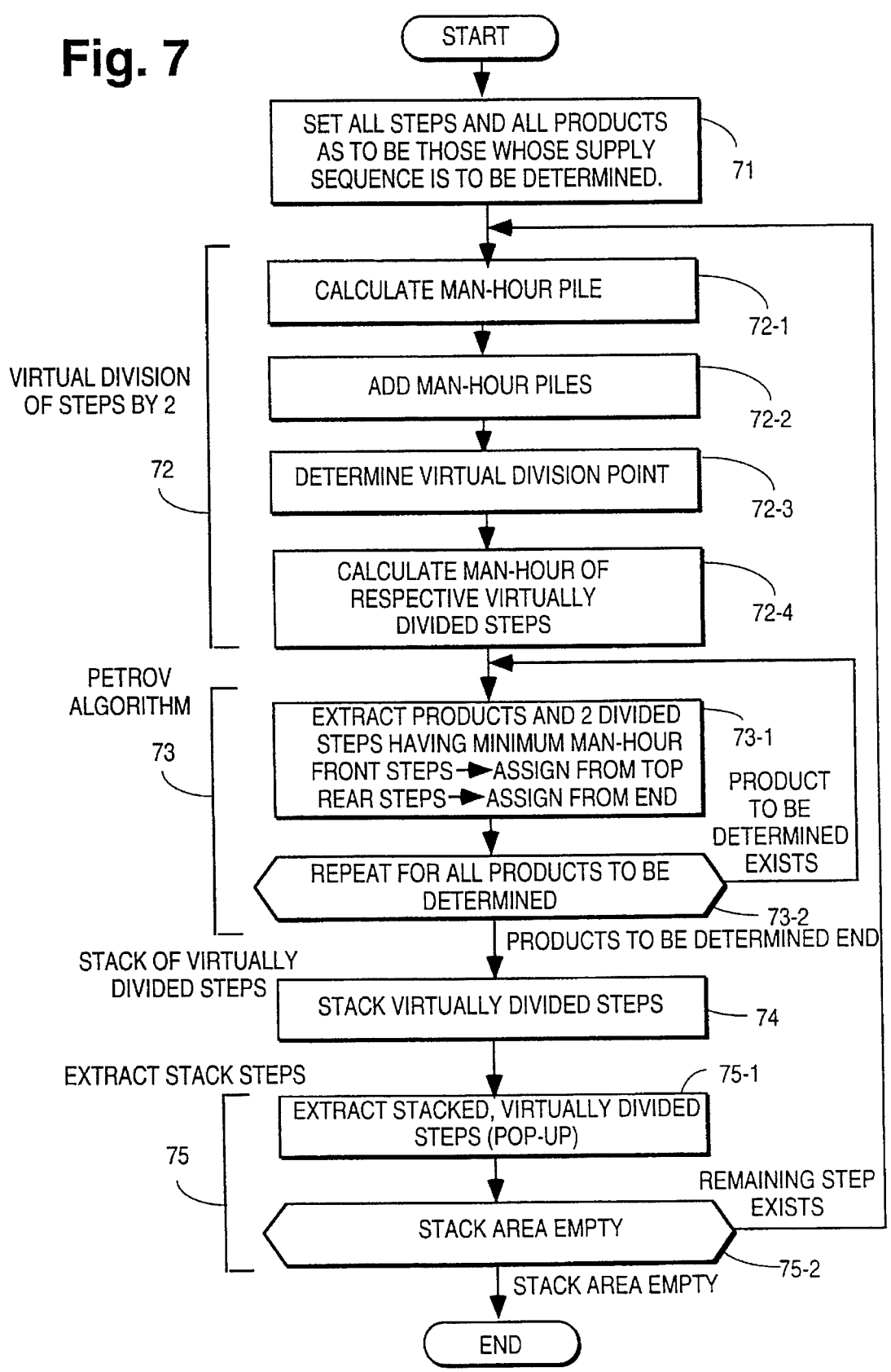
FIG. 7 is a flow chart showing the steps used in the method for determining a product supply sequence.

The processing procedures will be described with reference to FIG. 7 and FIGS. 9 to 12 in which FIG. 7 illustrates a flow chart showing the concrete processing procedures of the method for automatically determining product supply sequence and FIGS. 9 to 12 show concrete products and steps whose supply sequence is to be determined.

Figure 9:
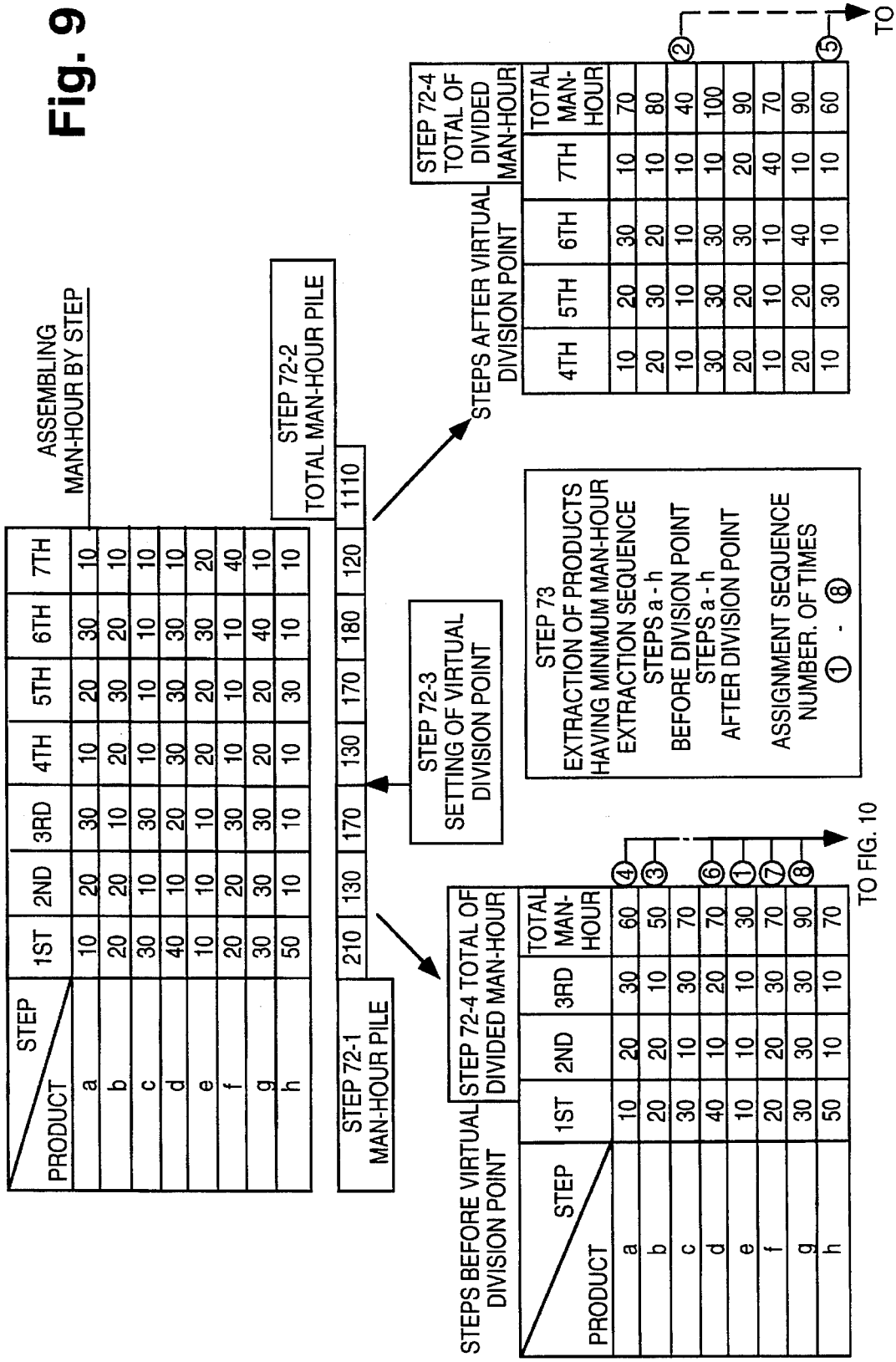
FIG. 9 is a schematic representation of a concrete example of products and steps for which the supply sequence is to be determined.

As shown in FIG. 7, step 71 is the initialization step in which all steps and all products are made objects of the supply sequence determination. Thus, for example, as shown in FIG. 9, products a to h up to steps 1st to 7th are the objects of processing. The man-hours of the respective steps of the respective products are assumed as shown in FIG. 9.

In step 72, the N-steps are divided to 2 virtual steps. Initially, in step 72-1, the man-hours required by each of the products in the respective steps, such as steps 1–7 shown in FIG. 9, are summed to calculate a man-hour pile for each of the steps. For example, as shown in FIG. 9, the man-hour piles in the 1st to 7th steps are 210, 130, 170, 180, 170, 180 and 120, respectively. In step 72-2, a total of the man-hour piles calculated in the step 72-1 is obtained. In the example shown in FIG. 9, the total of the man-hour piles is 1110.

In step 72-3, the piled man-hours are added from the first step through a step in which the sum becomes substantially half of the total man-hour pile. The step in which the sum becomes substantially half of the total man-hour pile is made a point at which the N-steps are virtually divided by two. In the example shown in FIG. 9, the total of man-hour piles from the 1st step to the 3rd is "510" which is about a half of the total man-hour piles, "1110." Consequently, the virtual division point is set between the 3rd step and the 4th step. In determining the virtual division point, it is enough that the point is within a predetermined range centered at the half of the total man-hour pile. Therefore, in the example shown in FIG. 9, it may be possible to set the virtual division point between the 4th step and the 5th steps. Finally, in step 72-4 the virtual 2 steps for all the products are calculated,as shown in FIG. 9, by obtaining a total of the man-hours for each of the products in the 1st to 3rd steps preceding the virtual division point and a total of the man-hours for each of the products in the 4th to 7th steps succeeding the division point.

Figure 10:
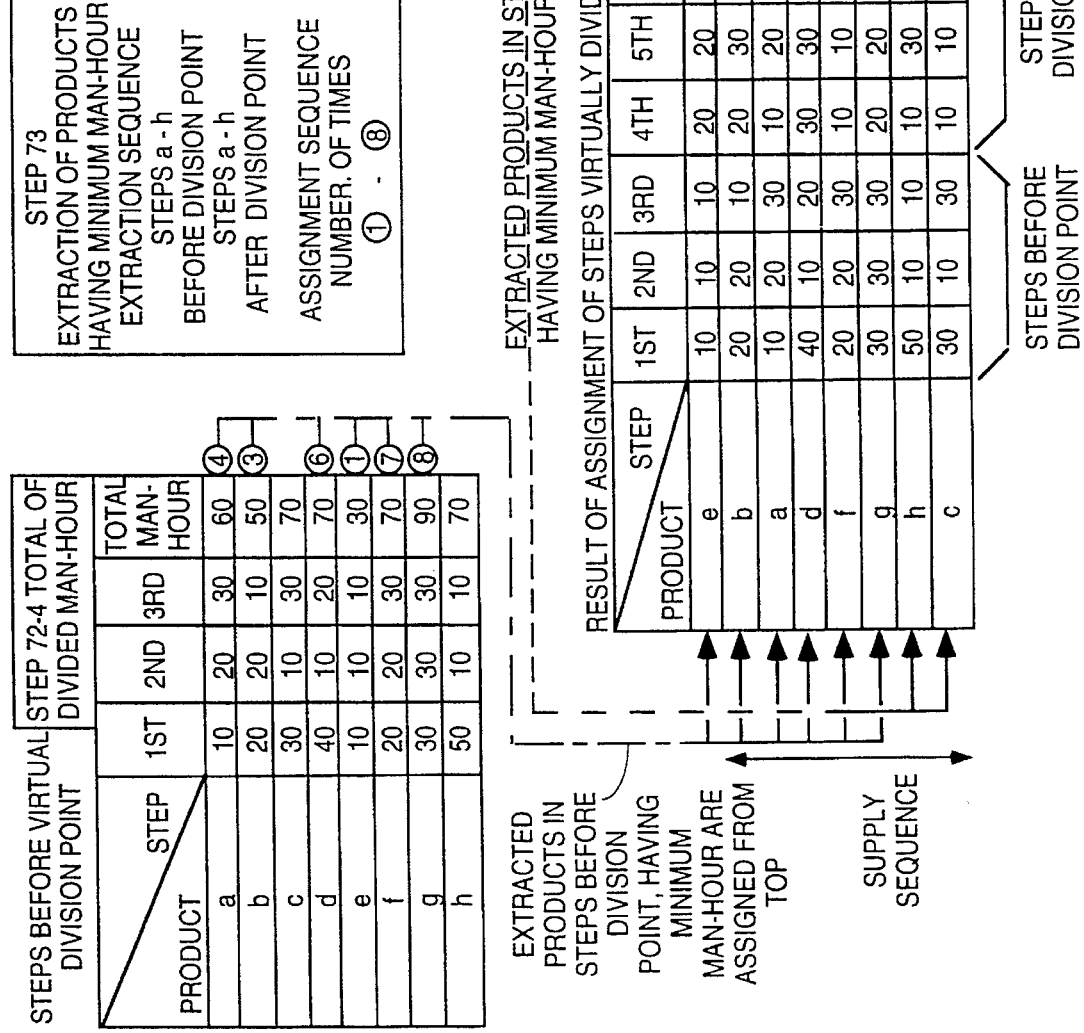
FIG. 10 is a continuation of FIG. 9.

In step 73, Petrov's Algorithm and Johnson's Rule are applied to the results of the virtual division step (step 72). Initially, in step 73-1, the total man-hours for each of the products before and after the virtual division point are compared to identify products and steps having a minimum total man-hours. For example, as shown in FIG. 10, the total man-hours for product a before the virtual division point equals 60 and the total man-hours for product a after the virtual division point equals 70. The minimum total man-hours are successively identified to establish an initial priority sequence based on minimum total man-hours. For example, as shown in FIG. 10, the minimum of all the total man-hours is "30," which corresponds to the total man-hours of product e before the virtual division point. The next smallest total man-hours is "40," which corresponds to the total man-hours for product c after the virtual division point.

The products are ultimately arranged in the priority sequence based both on the relative size for their minimum total man-hours and on the relation of their minimum total man-hours to the virtual division point. Specifically, products having a relative minimum total man-hours occurring before the virtual division point are assigned from the top or beginning of the priority sequence and products having a relative minimum total man-hours after the virtual division point are assigned from the end of the priority sequence. Thus, as shown in FIGS. 9 and 10, the absolute minimum of all the total man-hours obtained after the virtual division step is "30," for product e. Since this minimum occurs before the virtual division point, product e is assigned to the beginning of the priority sequence, as shown in FIG. 10. The next smallest total man-hours is "40" for product c. Since this total occurs after the virtual division point, product c is assigned to the end of the priority sequence, as shown in FIG. 10. The remaining products are assigned from the beginning or end of the final priority sequence in a similar manner. When this procedure is completed for all products which are objects of the supply sequence determination, the application of Petrov's algorithm is ended and the processing is shifted to step 74 (step 73-2). If not completed, the products which are assigned as of a current time are placed in the priority sequence as the top product and the end product and are excluded from those to be searched for relative minimum total man-hours, and step 73-1 is repeated until all products are processed.

Figure 11:
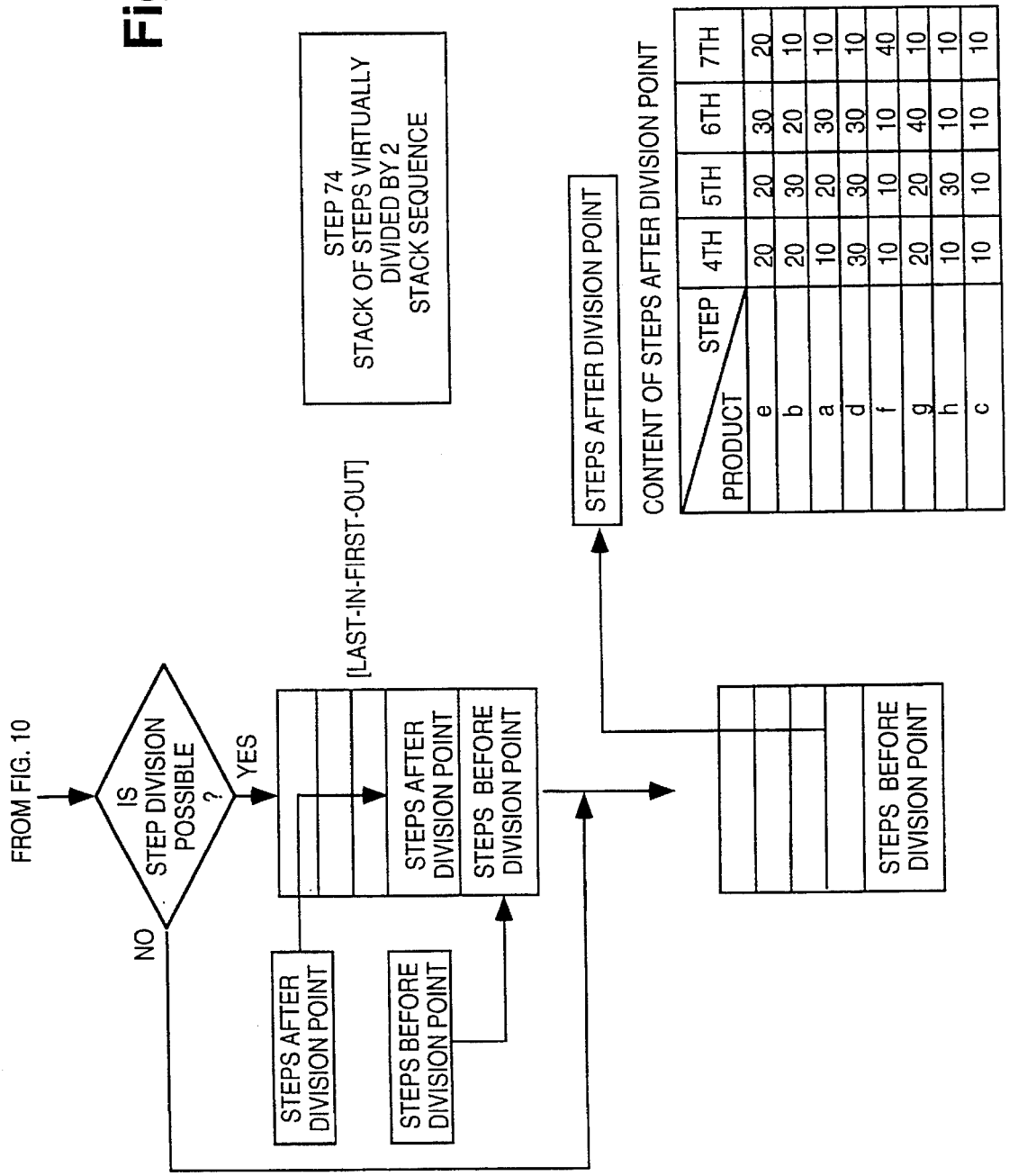
FIG. 11 is a continuation of FIG. 10.

In step 74, the steps before the virtual division point produced in step 72-3 are stored in the stack memory 9 in the main memory device 6 as steps for which a new supply sequence is to be determined, a process which is known as pushing down of the virtual division step. In this case, the series of the steps before the division point is stored first in the stack memory 9 and the series of the steps after the division point is stored thereafter as shown in FIG. 11.

Figure 12:
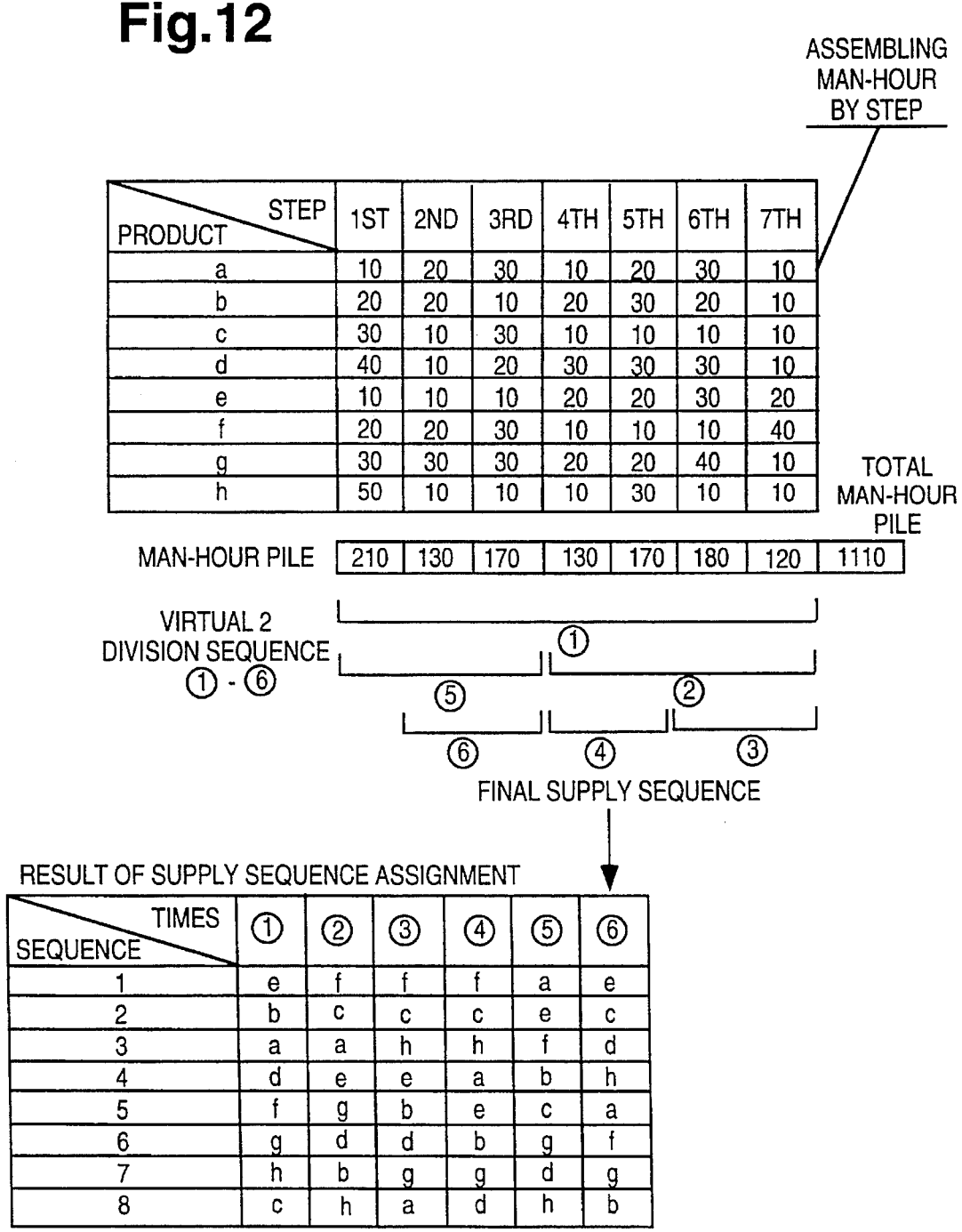
FIG. 12 is a schematic representation of a result of the supply sequence determination.

Step 75 involves the final derivation of the supply sequence from the steps stored in the stack memory 9. In step 75-1, the top-most series of steps is popped from the top of the stack memory. Thus, for example, the series of the 4th to 7th steps are derived in detail. In step 75-2, the processing is returned to step 72 if there are N-steps remaining which are objects of the supply sequence determination and N is greater than or equal to two. When all the N-steps which are objects of the supply sequence determination are derived, the optimum supply sequence automatic determination processing is completed. Thus, in the example in FIG. 9, the processing from step 72 is performed for the series of steps after the virtual division point including the 4th to 7th steps which are lastly stored in the stack memory 9 as new objects of the supply sequence determination. The 4th to 7th steps are divided again in the sequence shown by ④ to ④ in FIG. 12, then the 1st to 3rd steps are divided again in the sequence as shown by ⑤ to ⑥ and a supply sequence of the products is determined in the order of smallness of man-hour. As a result, the supply sequence is finally determined, as shown in FIG. 12.

Figure 8:
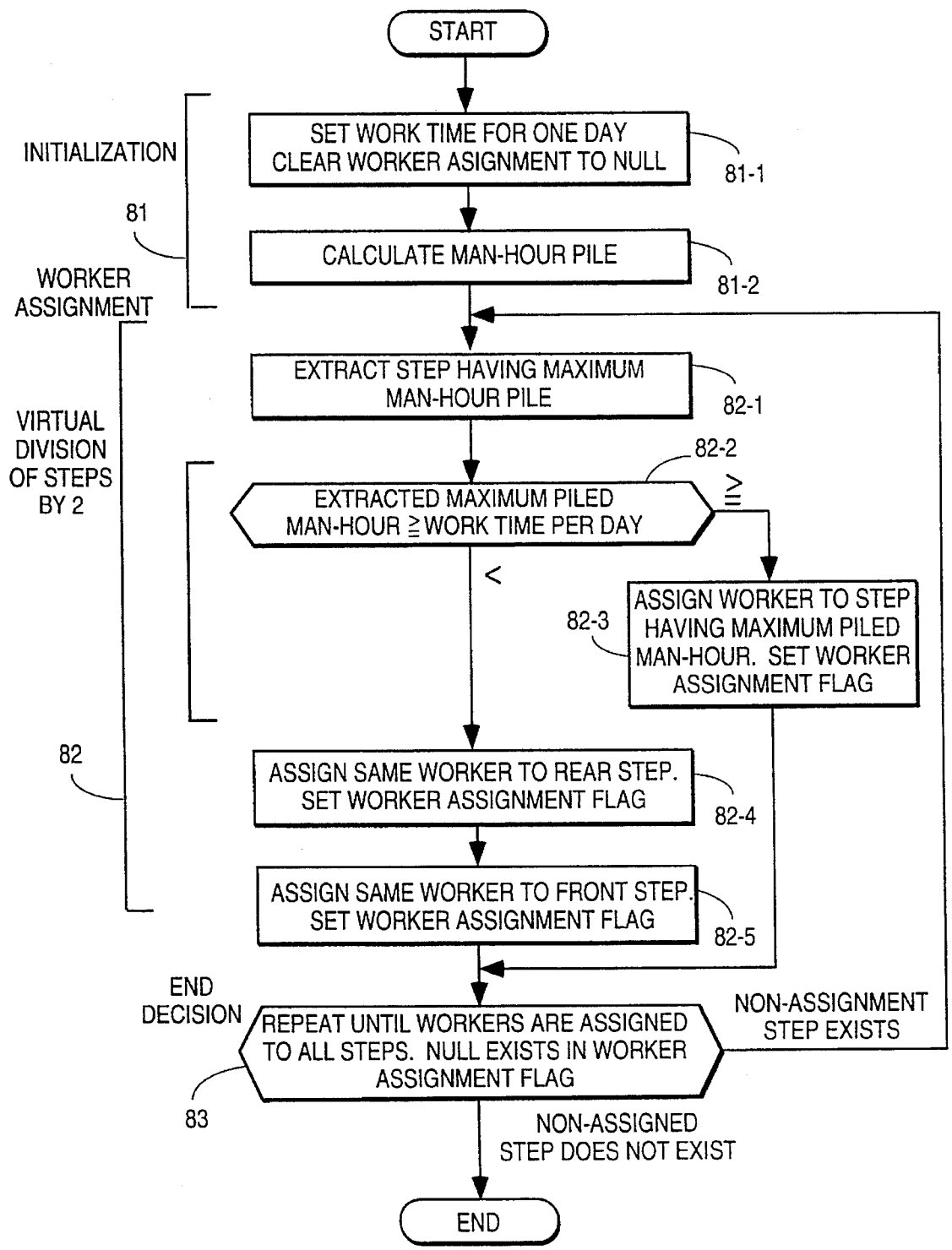
FIG. 8 is a flow chart showing the steps used in the method for determining an optimal worker arrangement.

The method of determining the worker arrangement will be described with reference to the flow chart shown in FIG. 8. Step 81 involves the initialization procedure. In step 81-1, the available work time for one day is defined and all worker assignments are initially nulled. In step 81-2, the products derived as to be supplied in a specific day are identified and the required man-hours for the N-steps for these products are summed to calculate man-hour piles for each of the respective N-steps. In step 82, workers are assigned to the respective N-steps on the basis of the man-hour piles. Initially, in step 82-1, the man-hour piles calculated in step 81-2 are searched to identify the N-step having a relative maximum man-hour pile. The identified man-hour pile is then compared to the available work time defined for one day. If the man-hour pile is equal to or greater than the available work time for one day, a worker is assigned to the identified N-step and processing passes to step 83. On the other hand, if the identified relative maximum man-hour pile is less than the work time available in one day, (or when there is a step for which the worker assignment is completed and the maximum man-hour is smaller than a sum of man-hours loaded on the workers), a subsequent step to the N-step having the relative maximum man-hour pile is checked and, if the subsequent step exists (if it is the last step, the processing is shifted to the step 82-5), the worker assignment flag of the subsequent step is checked to know whether or not a worker is assigned thereto. If no worker has been assigned to the subsequent step, the man-hour pile for the subsequent step is added to the maximum man-hour pile. If the sum of the man-hour piles equals or is larger than the available working time in a day, the same worker is assigned to the two N-steps and the worker assignment flags are set for the two N-steps. However, if the sum of the man-hour piles is less than the work time available in one day, the process of checking subsequent N-steps is repeated.

When the sum of the man-hour piles in step 82-4 is smaller than the working time for one day although a plurality of steps are assigned to one worker (or when there is a step for which the worker assignment is completed and the sum is smaller than the sum of man-hours loaded on that worker), that is, when there is no step subsequent to the step (in case of the final step) or the worker assignment to the subsequent step is already completed, a similar assignment processing is performed for a step proceeding a step whose man-hour detected is maximum (step 82-5). Specifically, the worker assignment flag of the proceding step is checked to know whether or not a worker is assigned thereto and, if not, a sum of the man-hour piles is obtained. If the sum of the man-hour piles is equal to or greater than the working time of one day, the worker assignment flag for the two N-steps is set, the same worker is assigned to the two steps and the worker assignment of the N-step having a relative maximum man-hour pile is completed. On the other hand, if the sum is smaller than the working time of one day, this processing is repeated.

In step 83, when the worker assignment for all of the steps is completed (there is no step whose worker assignment flag is null), the optimum worker assignment automatic determination processing is ended. If there is a step whose worker assignment is not completed, the processing is returned to step 82.

Figure 13:
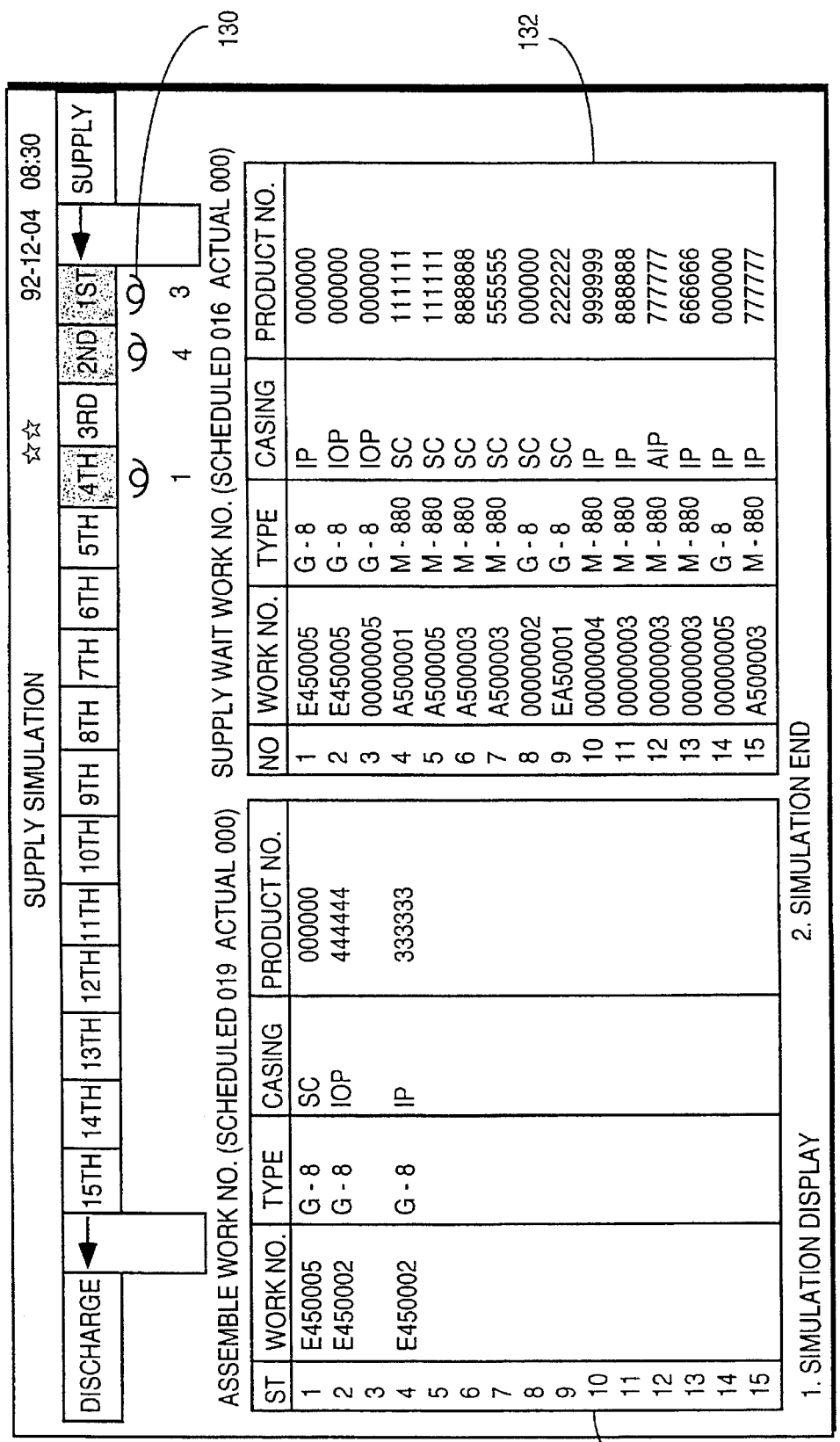
FIG. 13 is an illustration of an example of the supply sequence simulation display.

FIG. 13 shows, in a time chart format, a result of a simulation operation performed in the simulation portion 25 to review and confirm the supply sequence and the worker arrangement in the 15-step flow shop type production line, which are determined as previously described. In this figure, a frame indicating the respective steps 1st to 15th is displayed in an upper portion of a display content and a frame of the 1st, 2nd, and 4th steps to which the product assignment are performed are mesh-hatched. A numeral 130 indicating workers assigned to the 1st, 2nd, and 4th steps is attached below the frame together with the number of workers. A list 131 of products supplied to the production line and a list 132 of products which are waiting for supply are displayed in a lower portion of the figure. In the upper right side corner of the figure, a time at which the progression state shown is obtained is displayed.

When another time is assigned, the simulation portion 25 derives the supply state of product and the worker arrangement at the assigned time from the progression state file 13 and displays them. A manager can therefore confirm the product supply state and the worker arrangement by reviewing this display. If there is any unsuitable portion, he can determine the optimum product supply sequence and worker arrangement by rechecking and regulating them and resetting the results of the regulation in the product registration database 10. Consequently, the supply sequence determination method and device and the worker assignment method and device provide an effective way to determine an optimum worker arrangement corresponding to the various production schedules of the diversified small-quantity production type.

Figure 14:
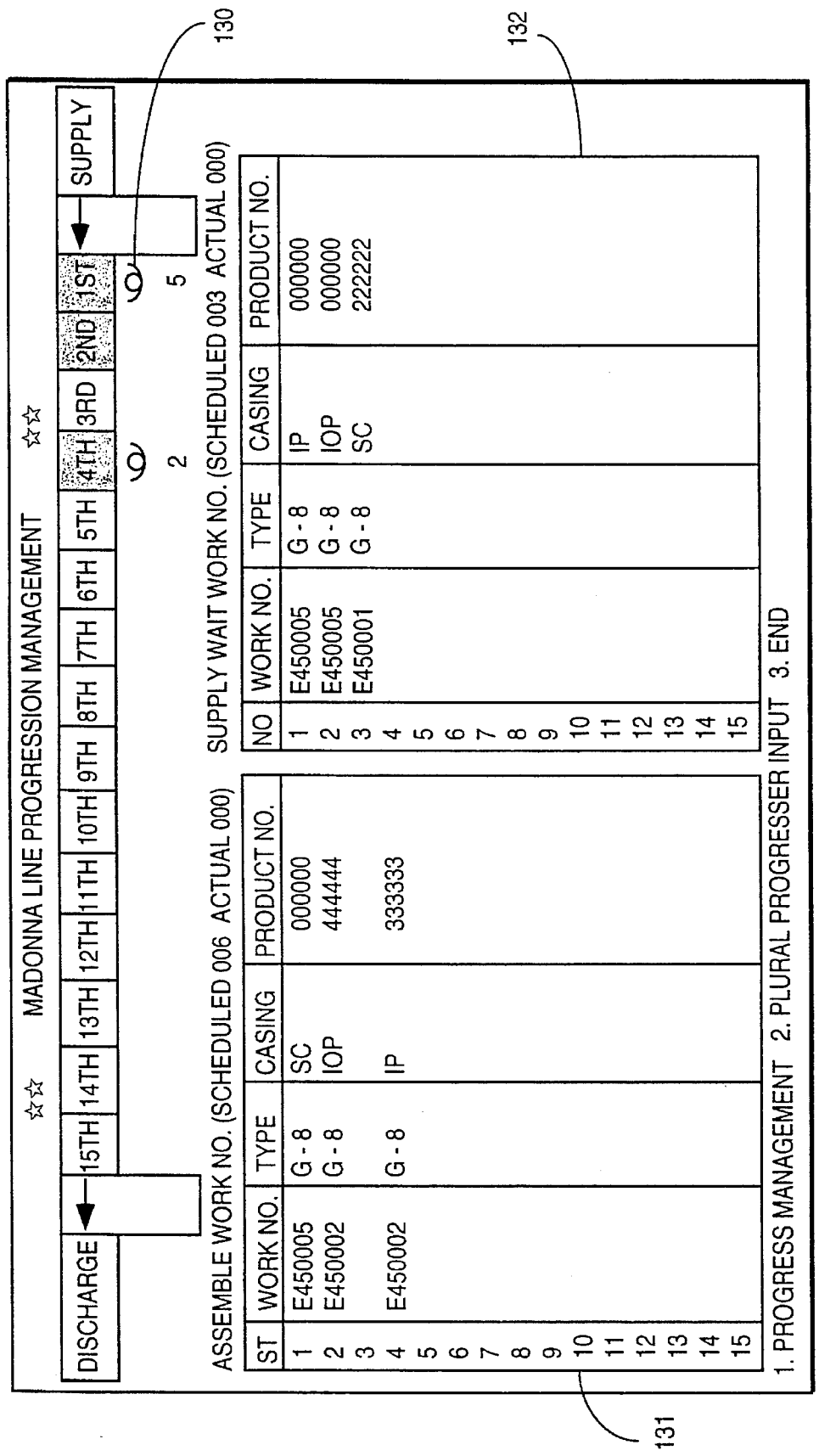
FIG. 14 is an illustration of an example of the progression state display.

FIG. 14 shows an example of the display of a progression state, in which frames of the 1st, 2nd, and 4th steps to which products are being assigned are mesh-hatched as in FIG. 13 and a numeral 130 indicating workers assigned to the 1st, 2nd, and 4th steps is attached below the frame together with the number of workers. A list 131 of the products supplied to the production line and a list 132 of the products which are waiting for supply are displayed in a lower portion of the figure. In this example, an end of work for a product in each step is signaled to the central processing device 3 by reading a bar code attached to the product by bar code reader 2 or by inputting the bar code from the key board 1. By simulating and displaying the supply and progression state in this manner, it becomes possible to evaluate and regulate in advance the worker commitment and arrangement.

In the past, evaluating the progression state has been performed by watching the flow of products in the actual production steps. According to this embodiment, however, a progression state can be known at the production time point by using the bar code reader 2, so that it becomes possible to know the progression of production over the production line immediately at a glance. Further, it becomes possible to totally manage the production line by uniting a set of procedures for the optimal supply sequence determination, the optimal worker arrangement, the simulation and the progression management, and performing them automatically.

As described hereinbefore, in the present invention, the supply sequence of products to be processed to the N-step flow shop type production line is determined by virtually dividing the N-steps to 2 virtual steps on the basis of a total number of necessary man-hours of products to be processed, sequencing the supply of the products to be processed in one of the virtual steps to a first step of the N-steps in the order of smallness of man-hours of the product, storing the products to be processed in the other virtual step in a stack memory as products for which a new supply sequence is to be determined and repeating the supply sequence determining processing recurrently as long as N is greater than or equal to two and the stack memory contains stored virtual steps. Therefore, it is possible to average production time between two adjacent steps in the N-step flow shop production line and to realize the minimization of a total production time of all products.

Further, the supply sequence of the products to be processed in a current day is determined after an undone product of a proceding day is preliminarily assigned to an undone step and the supply sequence of the products to be processed preferentially is determined after they are rearranged in priority. Therefore, it is possible to determine an optimal supply sequence by taking undone products and products to be processed preferentially into consideration.

In addition, after the man-hour pile of each step is calculated, the steps to which workers are not assigned as yet are searched sequentially to find a step whose man-hour pile is maximum and necessary workers are assigned thereto, and a step having man-hours smaller than that for one worker is combined with steps adjacent thereto and assigned to one worker. Therefore, it is possible to assign an optimal number of workers to the respective steps to produce all products within minimum time.

Last, the simulation operation and the display device allow review of the determined supply sequence and the determined worker arrangement. Consequently, it is possible to easily confirm whether or not the determined supply sequence and the determined worker arrangement are suitable.

What is claimed is:

1. A method of determining a supply sequence of products to be processed to an N-step flow shop type production line, where N is an integer greater than or equal to 2, for a group of products to be assembled on a given day in an assembly line, wherein each of the products has pre-determined number of man-hours needed for each of respective flow shop steps, comprising:

dividing N-steps to 2 virtual steps on the basis of a total number of the pre-determined necessary man-hours for the products to be processed;

assigning a supply sequence of the products to be processed in one of the virtual divided steps to a first step in the order of smallness of the pre-determined man-hours of the product in the virtual step;

if the other virtual step contains a plurality of individual steps, storing the other virtual step in a stack memory as products for which a new supply sequence is to be determined;

if the stack memory contains stored virtual steps, redefining N as being the number of individual steps contained in a virtual step stored in the stack memory;

repeating the supply sequence determining processing recurrently as long as N is greater than or equal to 2; and supplying the products to the N-step production line on the basis of the results of the supply sequence determination.

2. The method of claim 1, wherein the step of dividing N-steps to 2 virtual steps further comprises:

assigning an earliest processing start date and a latest scheduled finishing date to each of the products to be assembled on a given date;

assigning a day of determination to the given date; and comparing the given date with the earliest processing start day and the latest scheduled finishing date for each of the products to be assembled on the given date to thereby determine the supply sequence of the products to be processed.

3. The method of claim 1, further comprising:

assigning a day of determination to a first given date;

identifying products which have a second given date wherein the second given date is less than the first given date and the identified products have not been completely assembled;

assigning the identified products to a step in the N-step flow shop type production line; and thereafter dividing the N-steps to 2 virtual steps to determine the supply sequence.

4. The method of claim 1, further comprising:

identifying products that are to be assembled preferentially;

assigning a priority to each of the identified products;

arranging the identified products in the order of their assigned priorities; and thereafter dividing the N-steps to 2 virtual steps to determine the supply sequence.

5. An apparatus for determining a supply sequence of products to be processed to an N-step flow shop type production line, where N is an integer greater than or equal to 2, for a group of products to be assembled on a given day in an assembly line, wherein each of the products has pre-determined number of man-hours needed for the respective flow shop steps, comprising:

an external memory device for preliminarily storing a product database which registers products to be assembled and the pre-determined man-hours necessary for assembly of each of the products;

a stack memory for storing products for which the supply sequence has not been determined;

input means for inputting to the product database in the external memory device the products to be assembled and the pre-determined man-hours required for assembly of each of the products;

means for dividing the N-steps to 2 virtual steps on the basis of a total number of the pre-determined man-hours of the products to be processed;

means for assigning a supply sequence of the products to a first step in the order of smallness of the pre-determined man-hours of products in one of the virtual steps;

means for storing the products in the second virtual step in a stack memory as products for which a new supply sequence is to be determined, when the second virtual step contains a plurality of individual steps;

means for redefining N as being the number of individual steps contained in a virtual step in the stack memory; and means for providing a virtual step stored in the stack memory to the dividing means so as to repeat the supply sequence determining processing recurrently as long as N is greater than or equal to 2.

6. The apparatus of claim 5, wherein the external memory device further registers in the product database an earliest processing start date and a latest scheduled finishing date for each of the products in the data base and wherein the apparatus further comprises deriving means for deriving products whose supply sequence is to be determined by comparing a date of the determination of supply sequence with the earliest processing start day and the latest scheduled finishing date of the products in the product database whereby the supply sequence of the products to be processed is determined.

7. The apparatus of claim 5, further comprising:

means for assigning a day of determination to a first given date;

means for identifying products which have a second given date wherein the second given date is less than the first given date and the identified products have not been completely assembled; and means for assigning the identified products to a step in the N-step flow shop type production line before dividing the N-steps to 2 virtual steps to determine the supply sequence.

8. The apparatus of claim 5, further comprising means for identifying products that are to be assembled preferentially, means for assigning a priority to each of the identified products, and means for arranging the identified products in the order of their priority before dividing the N-steps to 2 virtual steps to determine the supply sequence.

9. A method of determining a worker arrangement in the respective processing steps of products to be processed and supplied in an N-step flow shop type production line, where N is an integer greater than or equal to 2, for a group of products to be assembled on a given day in an assembly line, wherein each of the products has a pro-determined number of man-hours needed for assembly, comprising:

calculating a man-hour pile for each of the steps in the N-step flow shop type production line;.

sequentially searching for a flow shop step whose man-hour pile is maximum among the flow shop steps;

assigning necessary workers to the flow shop step having the maximum man-hour pile; and if the maximum man-hour pile of the flow shop step is smaller than that for one worker, assigning the one worker to the flow shop step together with at least one other flow shop step adjacent thereto;

wherein the man-hour pile in the respective steps is a sum of the man-hours of the products to be processed in the respective steps, and wherein the method further comprises a supply sequence determining process which includes the steps of:

dividing N-steps to 2 virtual steps on the basis of a total number of necessary man hours of products to be processed;

assigning a supply sequence of the products in a first of the virtual steps to a first step in the order of smallness of the pre-determined man-hours for each product;

if the second virtual step contains a plurality of individual steps, storing the second virtual step in a stack memory as products for which a new supply sequence is to be determined;

if the stack memory contains stored virtual steps, redefining N as being the number of individual steps contained in a virtual step stored in the stack memory; and repeating the supply sequence determining process recurrently as long as N is greater than or equal to 2.

10. An apparatus for determining a worker arrangement in the respective processing steps of products to be processed and supplied in an N-step flew shop type production line, where N is an integer greater than 2, for a group of products to be assembled on a given day in an assembly line, wherein each of the products has a pre-determined number of man-hours needed for each of the respective flow shop steps, comprising:

an external memory device for preliminarily storing a product database which registers products to be assembled and the pre-determined man-hours necessary for assembly of each of the products;

input means for inputting to the product database in the external memory device the products to be assembled and the pre-determined man-hours required for assembly of each of the products;

means for determining the worker arrangement, including means for calculating man-hour piles for the respective steps in the production line, means for sequentially searching the man-hour piles to identify a step whose man-hour pile is maximum, and means for assigning necessary workers to the identified step having a maximum man-hour pile and for assigning at least a part of the steps adjacent to the step having a maximum man-hour pile to at least one of the workers assigned to the maximum man-hour pile step if the maximum man-hour pile is smaller than for one worker;

wherein the man-hour pile in the respective steps is a sum of the pre-determined man-hours of the products to be processed in the respective steps, and wherein the apparatus further comprises means for dividing N-steps to 2 virtual steps on the basis of a total number of pre-determined man-hours of products to be processed, means for assigning a supply sequence of the products to be processed to a first step in the order of smallness of the pre-determined man-hours of product in a first of the virtual steps, means for storing the second virtual step in a stack memory as products for which a new supply sequence is to be determined if the second virtual step contains a plurality of individual steps, means for redefining N as being the number of individual steps contained in a virtual step stored in the stack memory, and means for providing a virtual step in the stack memory to the dividing means to repeat the supply sequence determining processing recurrently as long as N is greater than or equal to 2.

11. The apparatus of claim 10, further comprising simulation and operation means for producing time charts of the respective steps by simulating progressions in the respective steps on the basis of a resultant worker arrangement in the respective steps, and display means for displaying a resultant supply sequence determination of products to be processed and the progression in the respective individual steps.

12. A method of determining a supply sequence of products to a production line having plural flow shop steps, wherein the number of steps is an integer greater than or equal to 2 and each of the products has a pre-determined number of man-hours needed for each of the respective flow shop steps, comprising:

calculating a total of the pre-determined necessary man-hours of the products per each flow shop step;

virtually dividing the plural flow shop steps to be processed into a first half and second half so that a sum of the total pre-determined necessary man-hours per each step involved in the first half is almost equal to a sum of the total pre-determined necessary man-hours per each step involved in the second half steps;

assigning a supply sequence of the products to be processed in order of smallness of total man-hours such that products from the first half should be processed first in the order of smallness of man-hour of a product and products from the second half should be processed late in the order of smallness of man-hour of a product;

testing whether either the first half or the second half contains more than 2 individual steps and if so, repeating the method from the virtual dividing step through the testing step until all virtual steps contain 2 or less individual steps; and supplying the products to the production line having a plural flow shop steps on the basis of the supply sequence determination.

13. The method of claim 12 wherein the testing step further comprises the step of applying the repeating step to the second half before repeating to process the first half, if both the first and second half contain more than two individual steps.

* * * * *

UNITED STATES PATENT AND TRADEMARK OFFICE
CERTIFICATE OF CORRECTION

PATENT NO. : 5,506,783
DATED : April 9, 1996
INVENTOR(S) : Kiyofumi Tanaka et al It is certified that error appears in the above-indentified patent and that said Letters Patent is hereby corrected as shown below:

On the title page: Item

[54], line 1, delete "APPARATUSA" and insert -- APPARATUS --

Cover page [54], line 3, delete "OT" and insert -- TO --

Column 1, line 1, delete "APPARATUSA" and insert -- APPARATUS --

Column 1, line 3, delete "OT" and insert -- TO --

Column 10, line 37 delete " 4 to 4 " and insert -- 2 to 4 --

Column 11, line 19, delete "proceeding" and insert -- preceding --

UNITED STATES PATENT AND TRADEMARK OFFICE
CERTIFICATE OF CORRECTION

PATENT NO. : 5,506,783
DATED : April 9, 1996
INVENTOR(S) : Kiyofumi Tanaka et al It is certified that error appears in the above-indentified patent and that said Letters Patent is hereby corrected as shown below:

Column 11, line 21, delete "proceding" and insert -- preceding --

Column 12, line 47, delete "proceeding" and insert -- preceding --

Column 12, lines 49 and 50 delete "rear ranged" and insert -- rearranged --

Column 14, Claim 9, line 64, delete "pro-determined" and insert -- pre-determined --

Column 15, Claim 10, line 32, delete "flew" and insert -- flow --

Signed and Sealed this

Twenty-fifth Day of June, 1996

Attest:

BRUCE LEHMAN

*Attesting Officer*  *Commissioner of Patents and Trademarks*